United States Patent
Doderer et al.

(10) Patent No.: US 6,591,675 B1
(45) Date of Patent: Jul. 15, 2003

(54) DEVICE FOR MEASURING THE MASS OF A FLOWING MEDIUM

(75) Inventors: Klaus Doderer, Neuenbuerg (DE); Hans Hecht, Korntal-Muenchingen (DE); Gerhard Hueftle, Aspach (DE); Manfred Strohrmann, Karlsruhe (DE); Rainer Schard, Esslingen (DE); Uwe Konzelmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/830,164
(22) PCT Filed: Aug. 18, 2000
(86) PCT No.: PCT/DE00/02832
§ 371 (c)(1), (2), (4) Date: Oct. 22, 2001
(87) PCT Pub. No.: WO01/14833
PCT Pub. Date: Mar. 1, 2001

(30) Foreign Application Priority Data

Aug. 21, 1999 (DE) .......................................... 199 39 824

(51) Int. Cl.[7] ................................................ G01F 1/68
(52) U.S. Cl. .................................................... 73/204.22
(58) Field of Search .......................... 73/204.22, 118.2, 73/202.5, 204.23, 204.26

(56) References Cited

U.S. PATENT DOCUMENTS

| | | | | |
|---|---|---|---|---|
| 4,829,818 A | * | 5/1989 | Bohrer | 73/204.22 |
| 4,919,947 A | * | 4/1990 | Barry et al. | 426/283 |
| 4,976,145 A | * | 12/1990 | Kienzle et al. | 73/118.2 |
| 5,693,879 A | * | 12/1997 | Rilling et al. | 73/118.2 |

* cited by examiner

Primary Examiner—Hezron Williams
Assistant Examiner—Jewel Thompson

(57) ABSTRACT

The invention relates to a device having a sensor carrier, which comprises a sheet-metal element and a plastic element and on which a measuring element introduced into the flowing medium is disposed. The use of plastic, which for the most part covers the sheet-metal element, means closer tolerances, which improve the performance of the sensor carrier both in terms of its facing into the flow and experiencing a flow around it, for instance by providing it with an improved aerodynamic leading edge, or the measuring element can be mounted flush to the surface and flush with edges of a sensor cavern, so that no turbulence occurs in the medium in the region of the measuring element or flow under the measuring element. The sensor region of the measuring element is reliably protected by recesses in the longitudinal edges and by a special adhesive bonding process from a gel emerging from the electronic evaluation circuit, so that the measuring characteristic curve behavior is not altered.

19 Claims, 7 Drawing Sheets

FIG. 4
a) 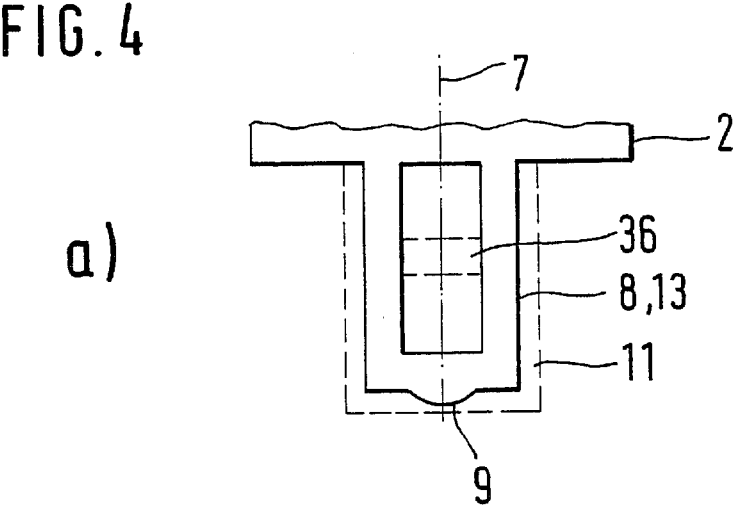
b) 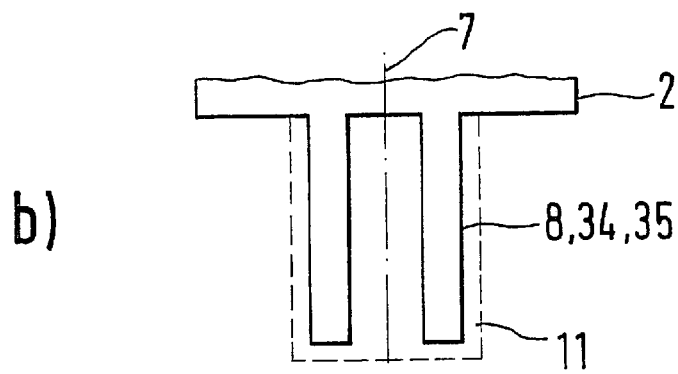
c) 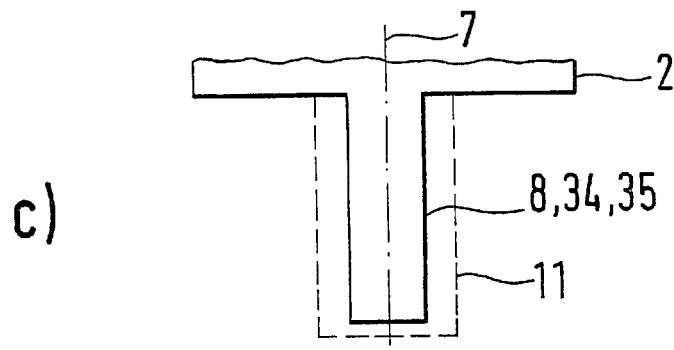
d) 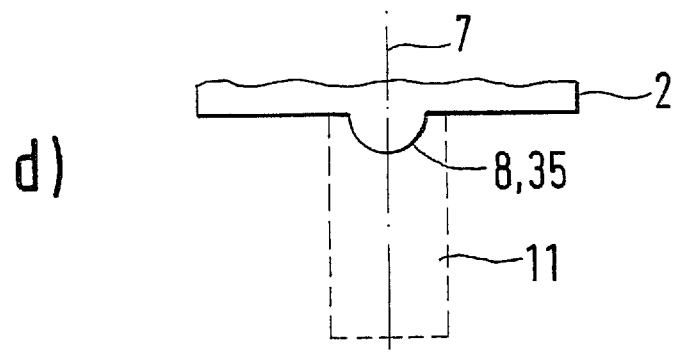

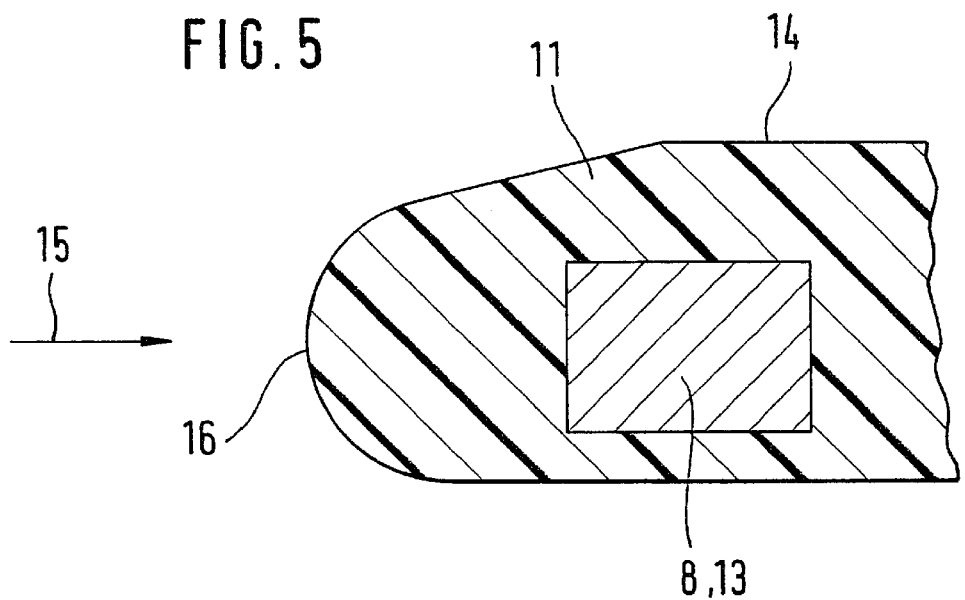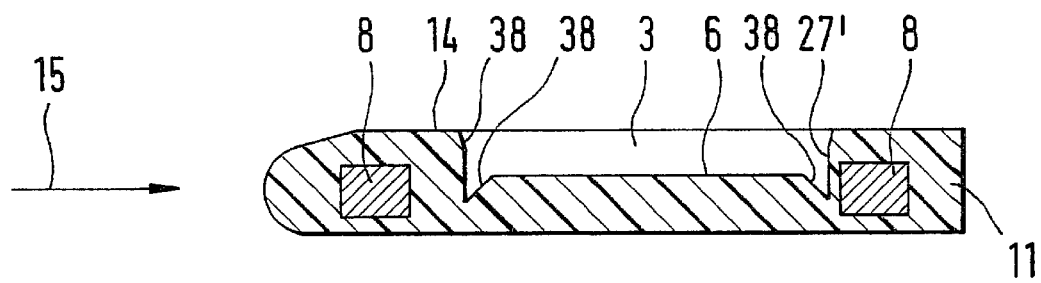

FIG.9
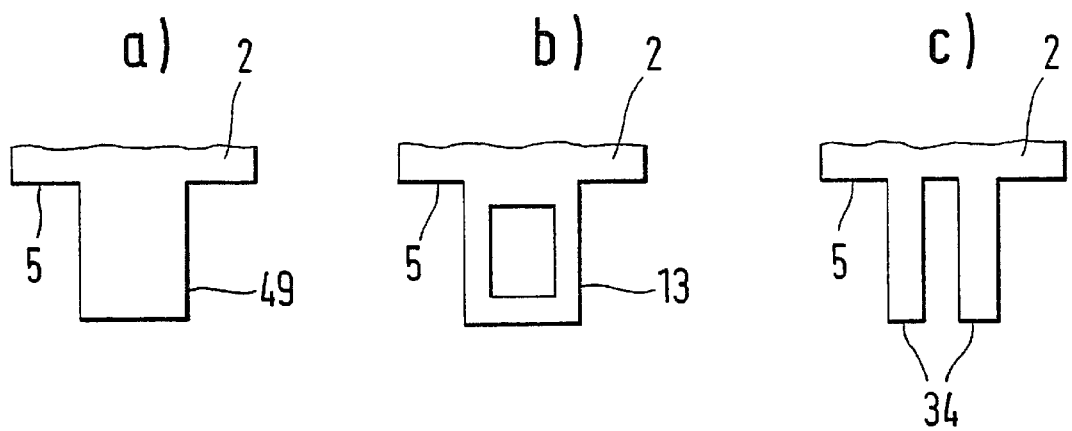
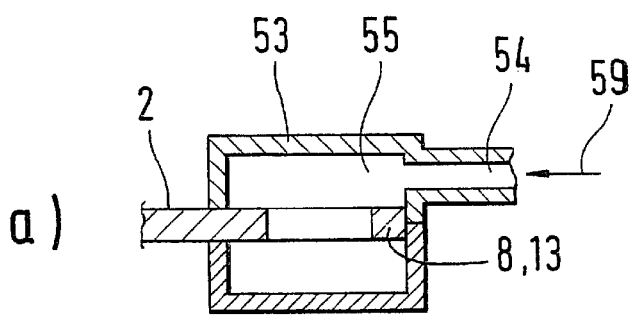
FIG.10
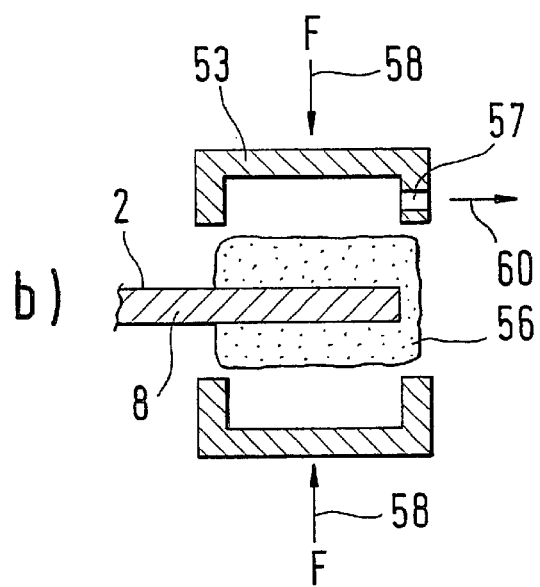

DEVICE FOR MEASURING THE MASS OF A FLOWING MEDIUM

CROSS-REFERENCE TO RELATED APPLICATIONS

This application is a 35 USC 371 application of PCT/DE 00/02832 filed on Aug. 18, 2000.

BACKGROUND OF THE INVENTION

1. Field of the Invention

The invention is directed to a device for measuring the mass of a flowing medium, or flow rate meter, with a sensor carrier for holding a measuring element, and on a method for producing a device for measuring the mass of a flowing medium with a sensor carrier.

2. Description of the Prior Art

German Patent DE 44 26 102 C2 and U.S. Pat. No. 5,693,879, disclose a sensor carrier for a measuring element in an air flow rate meter in which the sensor carrier with the measuring element protrudes into a measuring conduit in which a medium flows. The measuring element furnishes a measurement signal, which serves to calculate the mass of the flowing medium.

The sensor carrier has a recess, into which the measuring element is placed flush and retained by means of an adhesive layer applied to a bottom face of the recess. The sensor carrier is produced by first making an opening in a metal strip, the opening corresponding approximately to the external shape of the measuring element, and after that the metal strip is bent around a bending axis outside the recess and then compressed such that a bent portion of the metal strip forms a retaining element, and an unbent portion of the metal strip having the opening forms a frame element of the sensor carrier. The retaining element covers the opening of the frame element and with it forms a recess. After that, by further reshaping operations of the retaining element, mesa-like protuberances are created, which act as spacers or as a bearing face. The measuring element is then glued into the recess.

It is extraordinarily important that the measuring element with its surface be glued as flush as possible to the surface of the sensor carrier into the recess, since even the slightest offset, for instance from an unevenly applied adhesive layer, leads to eddies and separation zones that adversely affect heat dissipation from the measuring resistor, particularly at the surface of the measuring element, and adulterate the outcome of measurement. Very slight measurement tolerances in the recess must therefore be provided, and when the measuring element is glued into the recess of the sensor carrier, extreme care is needed; particularly in mass production of the device, this entails a major engineering effort, leading to high production costs.

The various work steps in producing the frame and retaining element are a disadvantage. The flowing medium can additionally flow through the seam gap between the frame and retaining element. However, this is not disadvantageous, since this effect can be suppressed by zero point measurement and calibration. However, the outcome of measurement is adulterated during the service life of the measuring element if this seam gap becomes plugged with dirt particles and/or liquid and the calibration is no longer correct.

It is disadvantageous that the spacers are not formed until a further shaping process. The tolerance in terms of the depth of the recess is dictated by the tolerance in the thickness of the metal strip and the tolerance of the seam gap thickness.

It is also disadvantageous that because of the flowing corrosive medium, a corrosionproofing layer must be applied to the sensor carrier, such as NiNiP, by means of an additional, expensive electroplating process or a coating method, and this layer further increases the dimensional processes, production times, and production costs.

In this kind of self-supported way of fastening the measuring element, tolerances in production create a gap between the measuring element and the recess of the sensor carrier. The gap can be so large that an undesired flow under the hollow chamber beneath the diaphragm of the measuring element can occur in the recess, which adversely affects the measurement outcome of the device.

In the literature, devices have therefore been described in which the disruptive influence of the flow underneath can be reduced.

Diverting the flow at a specially shaped edge of the measuring element, as described in German Patent Disclosure DE 195 24 634 A1 and U.S. Pat. No. 5,723,784, prevents the medium flowing in via the gap from reaching a hollow chamber underneath the diaphragm of the measuring element.

Applying adhesive seams, as described in German Patent Disclosure DE 197 43 409 A1, can prevent the penetration of the medium into the gap around the measuring element in order to prevent unwanted flows underneath.

However, a disadvantage of both methods is that only by the special provision of the adhesive seams or by additional provisions is the flow deflected around the hollow chamber in order to compensate for the affects of the production tolerances.

German Patent Disclosure DE 197 44 997 A1 discloses a device which makes it possible to protect the components of an evaluation circuit and the connecting lines to the contacting region of the measuring element from moisture by means of a gel, and soiling of the sensor region, that is, the part of the measuring element where a diaphragm is located, by the gel is prevented. Widening of a gap that extends between the measuring element and the walls of the recess is provided in various places, so that by means of the widened places, a further flow of a protective layer, applied at least in part to the evaluation circuit, in the gap can be reliably stopped, so that the flow path of the protective layer always remains unambiguously defined. This has disadvantages in terms of production, because gaps must additionally be created, and the flow of gel is not stopped but merely deflected in a defined way.

SUMMARY OF THE INVENTION

The device of the invention and the method of the invention have the advantage over the prior art that in a simple way, production and a measurement outcome even over a relatively long operating time are improved, since there is no longer any flow under the measuring element, since by narrowing the tolerances by the use of plastic, very precise placement of the measuring element into the sensor cavern is possible. Because of the arbitrary possibilities for shaping the plastic, it is possible to achieve filigreed shapes and take aerodynamic requirements, such as for the leading edge, into account, which cannot be done with metal. Since plastic in comparison with metal does not corrode as severely, no further corrosionproofing is necessary.

The production-dictated variation in the measurement outcome in the prior art resulting from an air flow through the open seam gap, or a seam gap that is becoming plugged, does not exist, and the tolerance in terms of the depth of the recess is determined according to the invention only by the tolerance of the shaping tool and no longer by the tolerance of the seam gap as well.

It is especially advantageous to produce a sheet-metal frame as a sheet-metal element and to spray-coat the sheet-metal frame; during the spraying process, the sheet-metal frame is firmly held in the shaping tool.

It is advantageous if the plastic used is selected from the class of plastics of liquid crystal polymers or partially crystalline aromatic thermoplastic.

It is also advantageous that the bulkhead is sprayed-on, because this makes an adhesive bond between the bulkhead and the sensor carrier unnecessary.

In the assembly process, it is advantageous that a bead of adhesive is placed crosswise over the sensor cavern bottom in the recesses in the longitudinal edges of the sensor cavern and completely seals off the sensor region of the measuring element in the sensor cavern, and that indentations are made in the peripheral region of the sensor cavern bottom, so that the measuring element can be inserted more precisely. Soiling of the measuring element is prevented by this bead of adhesive, by reliably stopping the gel that protects an evaluation circuit against moisture.

In the production, it is advantageous for the plastic for the plastic element to be applied to the sheet-metal element by such methods as eddy sintering or immersion or electrostatic powder spraying, and for the plastic element to be shaped after that.

BRIEF DESCRIPTION OF THE DRAWINGS

The foregoing and other objects and advantages of the invention will become apparent from the detailed description contained herein below, taken with the drawings, in which:

FIG. 2 shows the sensor carrier of FIG. 1 with the measuring element built in;

FIGS. 4a–d show four variants of the sheet-metal element for the sensor carrier;

FIG. 5 is a section taken along the line V—V in FIG. 3;

FIG. 6 is a section taken along the line VI—VI in FIG. 3, with indentations in the peripheral region of the sensor cavern bottom;

FIGS. 9a–c show method steps of the production process of the sheet-metal frame or of pins; and FIGS. 10a, b show two possible ways of coating the sheet-metal element with plastic.

DESCRIPTION OF THE PREFERRED EMBODIMENTS

The sensor carrier is part of an air flow rate meter known to one skilled in the art and from German Patent Disclosure DE 197 41 031 A1, which is hereby incorporated by reference.

Figure 1:
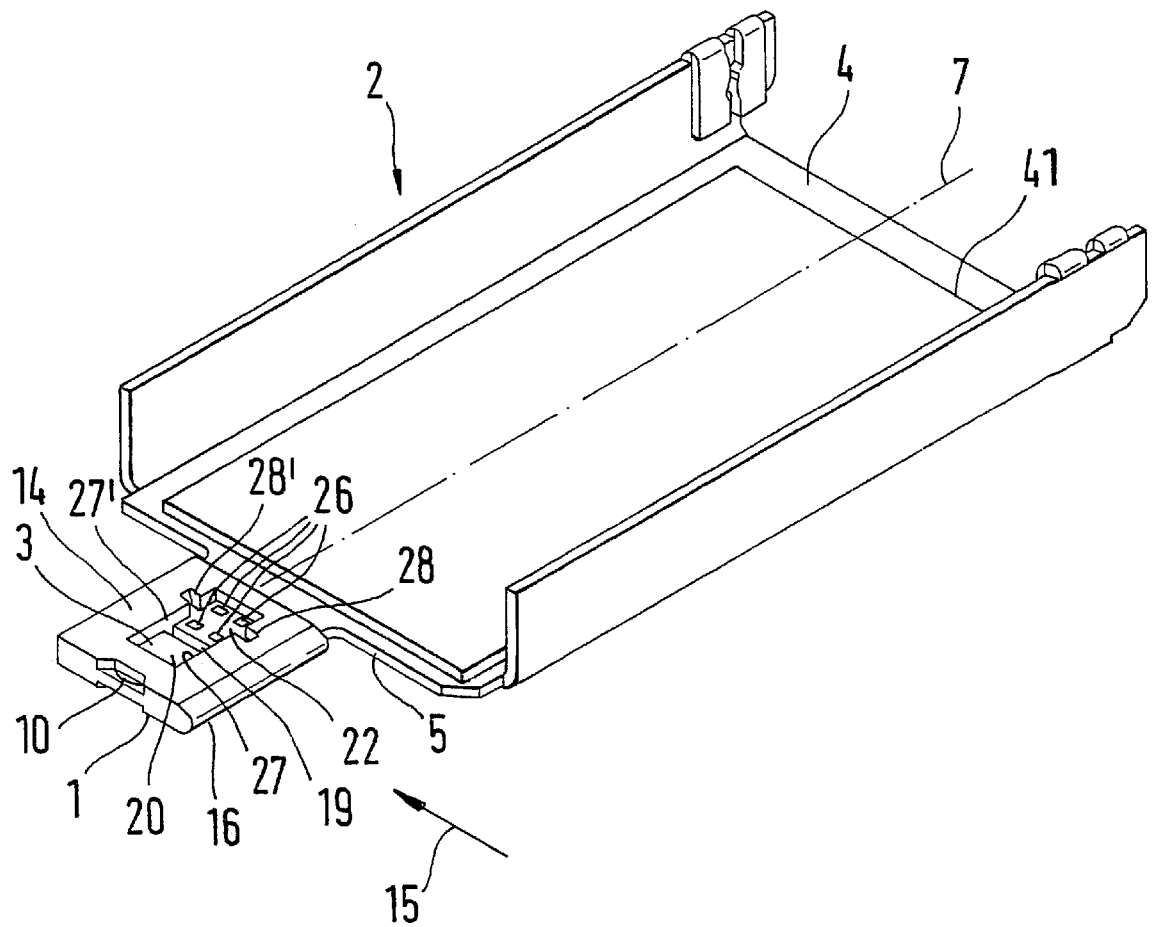
FIG. 1 shows a basic carrier part with a sensor carrier embodied in simplified form according to the invention.

FIG. 1 shows a sensor carrier 1 and a basic carrier part 2, which is connected to the sensor carrier 1. The basic carrier part 2 and its incorporation into the air flow rate meter is known from German Patent DE 44 26 102 C2 and U.S. Pat. No. 5,693,879, which are hereby incorporated by reference.

The sensor carrier 1 has a surface 14, which is for instance in the same plane or at the same height as a bottom 4 of the basic carrier part 2 or in other words is aligned with it, and in which a sensor cavern 3, for instance of rectangular shape, is recessed out. The basic carrier part 2 and the sensor carrier 1 have a longitudinal axis 7. In or on the basic carrier part 2, there is an electronic evaluation circuit 41, with a protective gel 42 applied to it.

Figure 2:
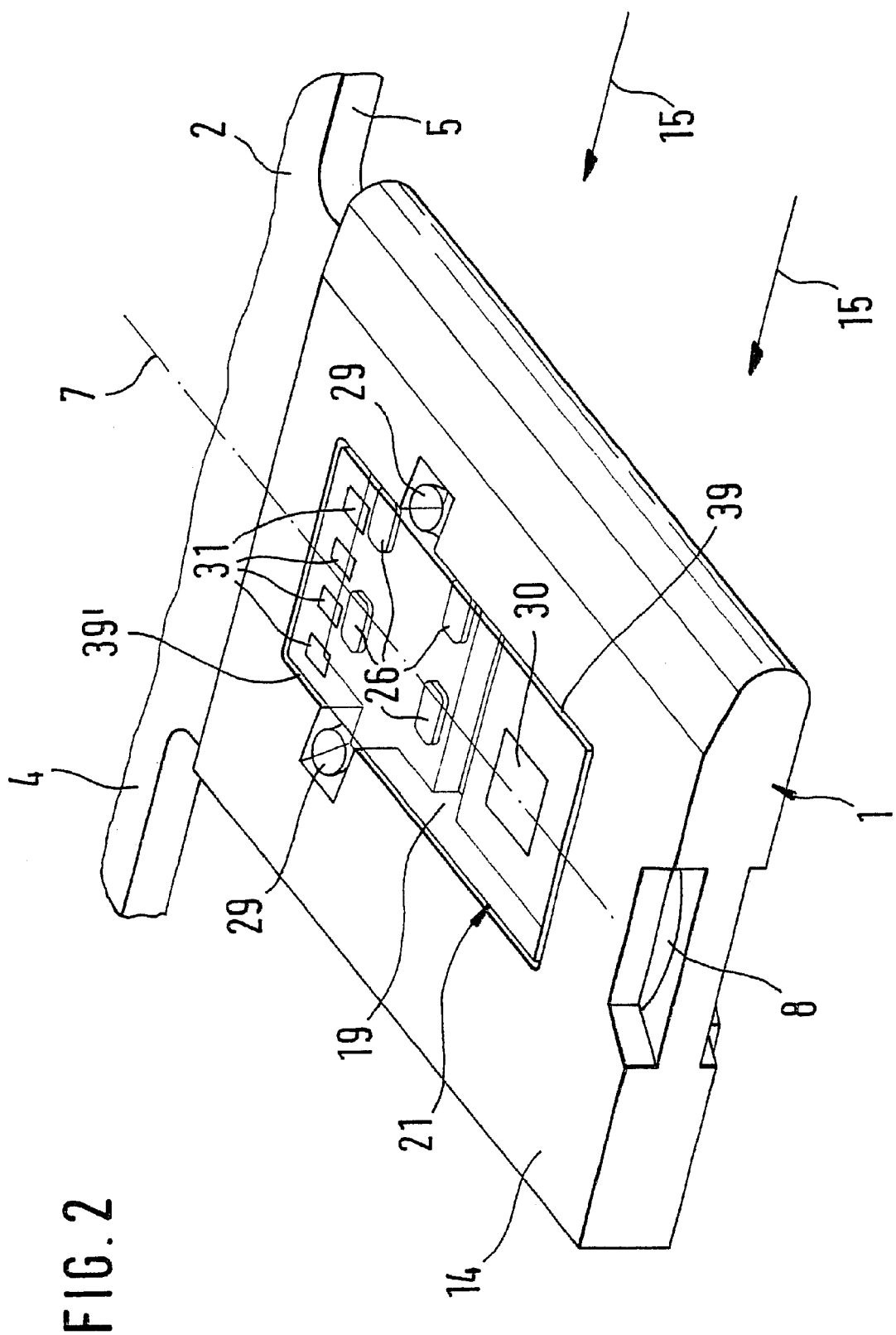

FIG. 2 shows the sensor carrier 1 with a built-in measuring element 21. In FIG. 2, the measuring element 21 is shown schematically and also partly transparently, and on an outward-oriented surface it has a diaphragm 30, which forms the sensor region. Contacts 31 that make the electrical connection with the electronic evaluation circuit 41 are located on the same surface, on the other end of the measuring element 21. The structure of the measuring element 21 and the description of the sensor region are provided in further detail in DE 197 43 409 or DE 43 38 891 A1 and U.S. Pat. No. 5,452,610, which are hereby incorporated by reference.

The measuring element 21 is disposed in the sensor cavern 3 in such a way that the contacts 31 are closest to the basic carrier part. The measuring element 21 is in the form of a chip here, as an example, and is flush with the sensor cavern 3. The sensor cavern 3 and the measuring element 21 form a gap 39. The measuring element 21 and the surface 14 of the sensor carrier 1 are flush with one another, as an example, here.

Figure 3:
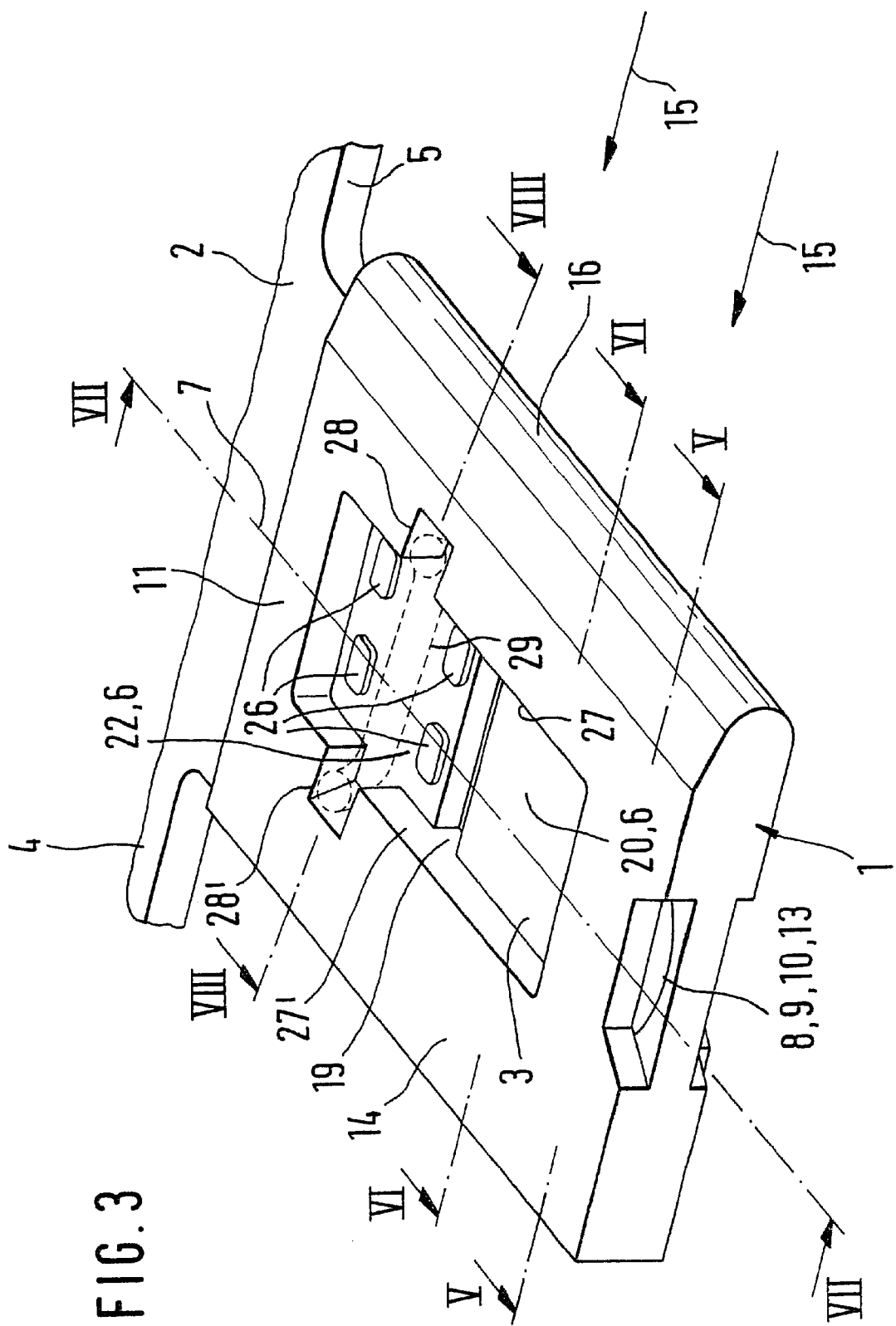
FIG. 3 shows the sensor carrier.

FIG. 3 shows the sensor carrier 1 and one edge 5 of the basic carrier part 2 in an enlarged view compared to FIG. 1. The sensor carrier 1 comprises a sheet-metal element 8 and a plastic element 11. For producing the plastic element 11, the sheet-metal element 8 is for instance spray-coated with plastic, which nearly completely covers the sheet-metal element 8. During the process of spraying to produce the plastic element 11, the sheet-metal element 8 is firmly held on one face end 9 on a retaining face 10 by elements of a shaping tool 53 (FIG. 10). This prevents bending of the sheet-metal element 8, which in this case is in the form of a sheet-metal frame 13 (FIG. 4a), and makes a uniform distribution of the plastic around the sheet-metal element 8 possible. Part of the retaining face 10 of sheet-metal frame 13 is therefore free of plastic.

The medium flows in the direction of the arrows 15 past the sensor carrier 1. It strikes a leading edge 16 of the sensor carrier 1, which because of the use of plastic is especially filigreed, for instance, and shaped especially aerodynamically. On the surface 14, there is the sensor cavern 3 with a sensor cavern bottom 6. The sensor cavern bottom 6 forms a retaining element, and edges of the sensor cavern 3 form a frame element.

The sensor cavern bottom 6 is divided by an adhesive positive-displacement chamber 19 into a sensor bottom face 20 and a bearing face 22. The sensor bottom face 20 is the farthest away from the basic carrier part 2 and is located under the sensor region of the measuring element 21. The bearing face 22 is closest to the basic carrier part 2.

The adhesive positive-displacement chamber 19 here is, by way of example, a continuous conduit or groove from one longitudinal edge 27 to the opposed longitudinal edge 27' of the sensor cavern 3. The longitudinal edges 27, 27' extend parallel to the longitudinal axis 7. However, the adhesive positive-displacement chamber 19 may also be embodied as noncontinuous, or in other words shorter. The adhesive positive-displacement chamber 19 between the sensor bottom face 20 and the bearing face 22 can also be formed for instance by at least two indentations in the sensor cavern bottom 6.

Spacers 26, for instance four of them, on which the measuring element 21 rests are located in the bearing face 22. The spacers 26 are embodied in the form of plateaus, for instance. One recess 28, 28' is embodied in each of the longitudinal edges 27 and 27'. From the recess 28 crosswise over the bearing face 22 to the other recess 28', a bead of adhesive 29, shown in dashed lines, is applied for the sake of the adhesive bonding process. Once the measuring element 21 has been inserted into the sensor cavern 3, the sensor bottom face 20 is protected by the bead of adhesive 29 completely from a sensor gel that is applied to an electronic evaluation circuit and that creeps in an undesired way toward the diaphragm 30.

After assembly, the measuring element 21 is for instance partly located in the sensor cavern 3 and partly rests on the spacers 26. The measuring element 21 is glued to the bearing face 22, for instance, by means of the bead of adhesive 29 and along its circumference, at the level of the surface 14, is flush with the sensor cavern 3, so that the medium flows hardly if at all under the measuring element 21 into the sensor cavern 3. A gap 39 (FIGS. 2, 8) between the measuring element 21 and the longitudinal edge 27 of the sensor cavern 3 has an order of magnitude of a few micrometers, for instance.

A depth of the sensor cavern 3 and the edges of the sensor cavern 3 are shaped for instance such that a measuring element 21, for instance a chiplike measuring element, can be introduced flush with the surface 14. The depth in the region of the bearing face 22 of the measuring element 21 beginning at the surface 14 is generally assigned a tolerance of ±10 micrometers.

The sensor carrier 1 is shaped here in such a way that the surface 14 and the face opposite it are plane-parallel to one another and are oriented in such a way to the primary flow direction 15 that a vector of the primary flow direction 15 is located in the same plane as the sensor region of the measuring element 21.

The vector of the primary flow direction 15 can intersect the plane of the sensor region at a small positive or negative angle. This is attained for instance by rotating the surface 14 relative to the bottom 4. Another possible way is for a cross section of the sensor carrier 1 to be wedge-shaped perpendicular to the surface 14; the thinner edge of the wedge is located in the region of the leading edge 16, and the vector of the primary flow direction 15 is not located in the surface 14.

FIG. 4 shows various possible ways for forming the sheet-metal element 8, which is connected to the basic carrier part 2. The plastic element 11 is indicated by dashed lines here.

As can also be seen in part in FIG. 3, FIG. 4a shows a sheet-metal frame 13 with a tab, forming the retaining faces 10, on the face end. The sheet-metal frame 13 can also have at least one rib 36, which is indicated by dashed lines in FIG. 4a. FIG. 4b shows a further exemplary embodiment of the sheet-metal element 8, in the form of two pins 34. In FIG. 4c, the sheet-metal element 8 is embodied as one pin 34. The sheet-metal frame 13 in FIG. 4a and protrusions 35 in the form of pins 34 (FIGS. 4b, c) can be embodied as long enough that during the application of plastic and/or in a shaping process, they can be firmly held in the region of the face end 9. The protrusions 35 in FIGS. 4b, c are made for instance by cutting, using a laser.

FIG. 4d shows a protrusion 35 which is markedly shorter than the length of the plastic element 11 along the longitudinal axis 7, with which protrusion the plastic element 11 can, however, still be connected.

FIG. 5 shows a section taken along the line V—V in FIG. 3. The aerodynamically shaped leading edge 16 of the plastic element 11 can be seen, which is exposed to the flow of the medium from the direction 15, along with part of the sheet-metal element 8, in this case a sheet-metal frame 13. It can also be seen that not only the leading edge 16 but also part of the surface 14, for instance, is aerodynamically shaped, for instance being flattened toward the leading edge 16.

FIG. 6 shows a section taken along the line VI—VI in FIG. 3. Along the peripheral region of the sensor cavern bottom 6 of the sensor cavern 3, or along the longitudinal edges 27, 27', there are indentations 38, for instance, in the plastic element 11. The indentation 38 is formed here for instance by beveling the sensor cavern bottom 6 toward the longitudinal edge 27. When an image processing system used for mounting the measuring element 21 in the sensor cavern 3 is brightly illuminated, these indentations 38 appear dark and thus offer better contrast. As a result, the measuring element 21 can be guided very precisely in the assembly process. Very narrow gaps 39 (FIG. 2) between the measuring element 21 and the sensor carrier 1 are thus attainable, as are replicable flow conditions.

Preferably, there is also a bevel extending all the way around on one edge at the level of the surface 14. Besides more-precise assembly, it forms an insertion incline for mounting the measuring element 21 and also forms a more-defined oncoming flow to the measuring element 21, since rectangular edges often form burrs and lead to variations in the behavior of measurement characteristic curves.

Figure 7:
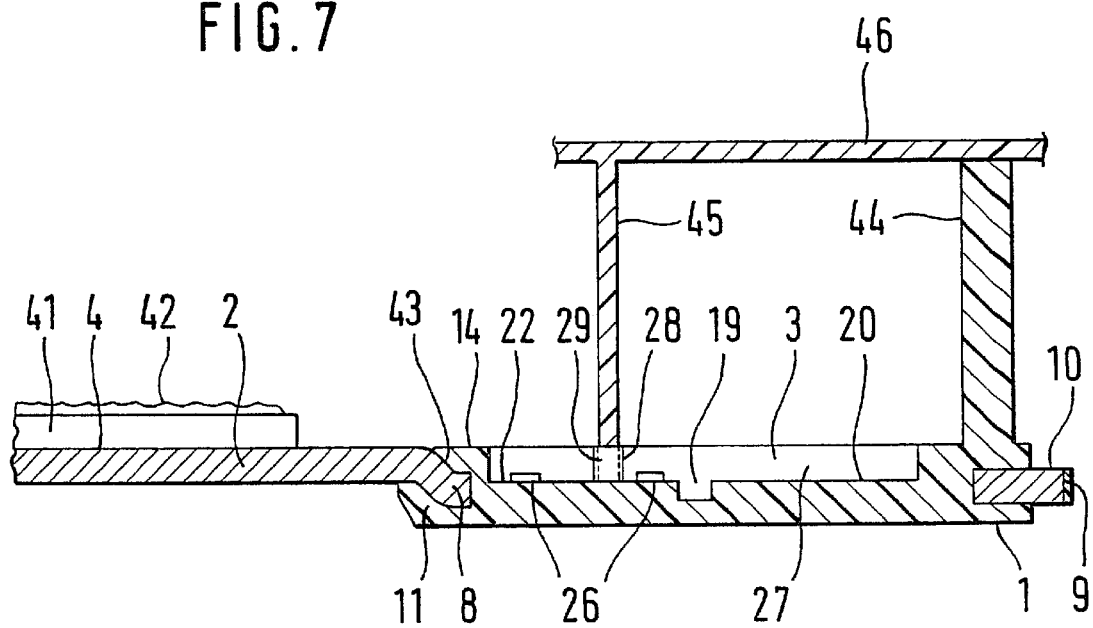
FIG. 7 is a section taken along the VII—VII in FIG. 3, with a bulkhead.

FIG. 7 shows a section taken along the line VII—VII of FIG. 3. It can be seen that in the vicinity of a line 43, extending perpendicular to the plane of the drawing, between the basic carrier part 2 and the sheet-metal element 8, a bending zone for instance exists. The surfaces of the sheet-metal element 8 and of the basic carrier part 2 now extend offset but virtually parallel to one another. The surfaces of the plastic element 11 and of the basic carrier part 2 also now extend offset but virtually parallel to one another. The surface 14 of the plastic element 11 can for instance be located at virtually the same level as the bottom 4 of the basic carrier part 2.

A bulkhead 44, for instance, is sprayed onto the sensor carrier 1 in the region of the face end 9 of the sensor carrier 1, but after the retaining face 10 as viewed from the face end 9. This makes adhesive bonding of the bulkhead 44 to the sensor carrier 1 unnecessary; otherwise, the bulkhead is secured to a cap 46. The bulkhead 44 extends approximately in the flow direction 15. Furthermore, between the evaluation circuit 41 and the measuring element 21, a partition 45 is provided, and the partition 45 extends as far as the surface 14. The partition 45 extends approximately in the flow direction 15. The cap 46 is part of the device and closes a bypass conduit of the device, through which the medium flows to the measuring element 21. The bulkhead 44 and the partition 45 at least partly define the bypass conduit. The partition in conjunction with the cap 46 makes it possible to protect the sensor region securely against the protective gel 42 of the evaluation circuit 41.

The recess 28 in the longitudinal edge 27 is for instance located at the place where the partition 45, which is secured to the cap 46, extends into the device after the cap 46 has been inserted. This is also where the bead of adhesive 29 is for instance applied to the bearing face 22.

In mounting of the measuring element 21 in the sensor cavern 3, adhesive can be positively displaced into the adhesive positive-displacement chamber 19 that may for instance be present, and accordingly this adhesive does not reach the region of the sensor bottom face 20.

Figure 8:
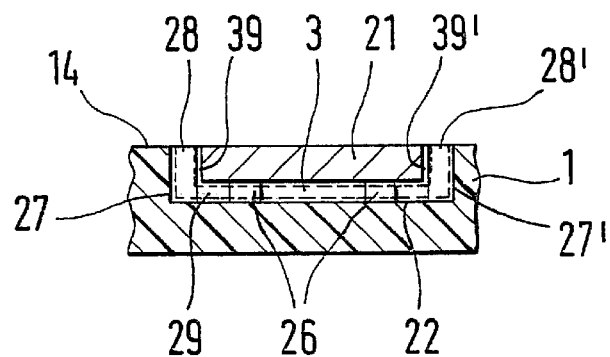
FIG. 8 is a section taken along the line VIII—VIII in FIG. 3, with a measuring element.

FIG. 8 shows a section taken along the line VIII—VIII in FIG. 3 through the sensor carrier 1 with the measuring element 21 placed in it and the bead of adhesive 29 (suggested in dashed lines). The bead of adhesive 29 has been placed, for instance from the recess 28 at the longitudinal edge 27, via the bearing face 22 to the recess 28' on the longitudinal edge 27'. After the measuring element 21 has been inserted into the sensor cavern 3, adhesive is forced outward for instance into the adhesive positive-displacement chamber 19 and through the gaps 39, 39' and reaches as far as the surface 14. The adhesive completely closes the gap 39 between the measuring element 21 and the sensor cavern 3 along one longitudinal edge 27 continuously under the measuring element 21 to the other longitudinal edge 27' and the gap 39', so that soiling of the measuring element 21 with its diaphragm 30 is prevented by reliably stopping creepage of the protective gel 42 of the evaluation circuit 41.

FIG. 9a shows a metal strip 49, which protrudes from the edge 5 of the basic carrier part 2, before its further processing. It is produced for instance by stamping out an opening in the metal strip 49 of the sheet-metal element 8, in the form of a sheet-metal frame 13 (FIG. 9b) or of two pins 34 (FIG. 9c). The sheet-metal frame 13 or the pin or pins 34 can be bent as shown in FIG. 7.

Once a sheet-metal element 8 in accordance with FIG. 9 or some other version of the sheet-metal element has been produced, the basic carrier part is already finished, and the sheet-metal element 8 has been bent for instance as shown in FIG. 7, the plastic element 11 is placed on the sheet-metal element 8. The bending of the metal strip 49 can also be done before the machining of the metal strip of FIG. 9.

FIG. 10a for instance schematically shows how the sheet-metal element 8, in this case a sheet-metal frame 13, is located in the shaping tool 53, which completely surrounds the sheet-metal element except for an opening 54. Through the opening 54, for instance by injection of thermoplastic plastic using known plastic injection processes into the hollow chamber 55, represented by the arrow 59, the plastic element 11 and the connection to the sheet-metal element 8 are formed. The sheet-metal element 8 is not firmly held in this case.

In FIG. 10b, the plastic 56 has already been applied to the sheet-metal element 8 by means of a suitable method, such as eddy sintering, immersion, or electrostatic powder spraying or the like. Then the shaping tool 53 is compressed with a force F in the direction 58, and excess, still-deformable, for instance thermoplastic plastic 56, is forced outward from the opening 57 in the direction 60.

Alternatively, the plastic element 11 can also be prefabricated and can simply be joined to the sheet-metal element 8 by adhesive bonding or welding, with the plastic element 11 having been slipped onto the sheet-metal element 8 or placed on it beforehand.

The foregoing relates to preferred exemplary of embodiments of the invention, it being understood that other variants and embodiments thereof are possible within the spirit and scope of the invention, the latter being defined by the appended claims.

What is claimed is:

1. In a device for measuring the aspirate air mass of internal combustion engines, the device having a sensor carrier (1) including a sheet-metal element (8) joined to a basic carrier part (2) and a measuring element (21) disposed on said sensor carrier (1) for positioning in the flowing medium the improvement wherein said sheet-metal element (8) is encased in a plastic element (11), said plastic element (11) contacting the sheet-metal element (8) over substantially the entire surface area of the sheet metal element (8).

2. The device of claim 1, wherein said sheet-metal element (8) is in the form of a frame (13); said plastic element (11) sheathing said sheet-metal frame (13) completely or in part, and wherein an area enclosed by said sheet-metal frame (13) is at least substantially closed by said plastic element (11).

3. The device of claim 1, wherein said sheet-metal element (8) comprises at least one protrusion (35).

4. The device of claim 1, wherein said sensor carrier (1) has an aerodynamically shaped leading edge (16) of plastic, said leading edge pointing counter to the flowing medium.

5. The device of one of claim 1, further comprising a sensor cavern (3) with a sensor cavern bottom (6) in the plastic element (11), said measuring element (21) being disposed in said cavern, said sensor cavern (3) forming a frame and retention element for said measuring element (21).

6. The device of claim 1, wherein said sensor carrier (1) is shaped or oriented toward a primary flow direction (15) of the flowing medium to provide a vector of the primary flow direction (15) located in the plane of a sensor region of said measuring element (21) or intersecting the plane of said sensor region at a small positive or negative angle.

7. The device of claim 5, further comprising a surface (14) of the plastic element (11) located approximately at the same level as the bottom (4) of the basic carrier part (2), said sensor cavern (3) being located in said surface (14).

8. The device of claim 5, wherein said sensor cavern (3) in its dimensions at the level of the surface (14) of the plastic element (11) is approximately equivalent to the dimensions of the measuring element (21), wherein said measuring element (21) can be placed flush into said sensor cavern (3), to substantially eliminate flow of the medium under said measuring element (21) into said sensor cavern.

9. The device of claim 8, wherein said sensor cavern (3) has two opposed longitudinal edges (27, 27'), and wherein between the circumference of said measuring element (21) and said longitudinal edges (27, 27') a gap (39, 39') is formed, said gap having a size on the order of magnitude of a few micrometers.

10. The device of claim 8, wherein the dimensions of said sensor cavern (3) are approximately equivalent to the dimensions of said measuring element (21), wherein said measuring element (21) is flush with said surface (14) of the plastic element (11).

11. The device of claim 8, further comprising a bulkhead (44) mounted on said surface (14) of said plastic element (11), outside said sensor cavern (3) in the region of one face end (9) of said sensor carrier (1).

12. The device of claim 8, further comprising indentations (38) in a peripheral region of said sensor cavern bottom (6).

13. The device of claim 8, where in said measuring element (21) is glued to said sensor cavern bottom (6).

14. The device of claim 13, further comprising at least one adhesive positive displacement chamber (19) in the form of a conduit is formed in said sensor cavern, said conduit extending in the direction from one longitudinal edge (27) of said sensor cavern bottom (6) parallel to the leading edge (16) of the sensor carrier (1), to an opposite longitudinal edge (27'), whereby upon insertion of the measuring element (21) into the sensor cavern (3) of the sensor carrier (1) adhesive placed in the sensor cavern (3) can escape into said conduit, said conduit dividing said sensor cavern bottom (6) into a bearing face (22), onto which the adhesive is applied, and a sensor bottom face (20) located under a diaphragm (30) of said measuring element (21).

15. The device of claim 13, further comprising a recess (28, 28') formed one in each of the two opposed longitudinal edges (27, 27') of said sensor cavern (3) extending parallel or slightly inclined to the leading edge (16) of said sensor carrier (1), said recesses (28, 28') being made in the region of a bearing face (22), a bead of adhesive (29) placed in said recess, said adhesive being forced out into said sensor cavern (3) upon insertion of the measuring element (21), whereby a gap (39) between said measuring element (21) and said sensor cavern (3) on one longitudinal edge (27), an adjoining gap between said measuring element (21) and the bearing face (22), and a gap (39') adjoining the latter gap on the other longitudinal edge (27') are closed completely by said adhesive.

16. The device of claim 15, wherein said device further comprises a cap (46) connected to a partition (45) having one free end extending to the surface (14) of the plastic element (11), said recesses (28, 28') in said longitudinal edges (27, 27') of said sensor cavern (3) extending in the direction of the partition (45) and being at least partly covered by it.

17. The device of claim 8, further comprising one or more spacers (26) in the form of protuberances provided in said sensor cavern bottom (6).

18. The device of claim 17, further comprising one or more spacers (26) in the form of protuberances provided in the region of the bearing face (22) and/or of the sensor bottom face (20).

19. The device of claim 1, wherein, as the plastic material for the plastic element (11), is selected from the class of plastics of liquid crystal polymers, or partly crystalline aromatic thermoplastic.

* * * * *

UNITED STATES PATENT AND TRADEMARK OFFICE
CERTIFICATE OF CORRECTION

PATENT NO. : 6,591,675 B1  
DATED : July 15, 2003  
INVENTOR(S) : Klaus Doderer et al.

It is certified that error appears in the above-identified patent and that said Letters Patent is hereby corrected as shown below:

<u>Title page,</u>
Item [74], should read as follows:

-- [74] *Attorney, Agent, or Firm*— Ronald E. Greigg --

Signed and Sealed this

Fourteenth Day of October, 2003

JAMES E. ROGAN
*Director of the United States Patent and Trademark Office*